United States Patent
Yoo et al.

(10) Patent No.: US 8,024,717 B2
(45) Date of Patent: Sep. 20, 2011

(54) METHOD AND APPARATUS FOR EFFICIENTLY PROCESSING ARRAY OPERATION IN COMPUTER SYSTEM

(75) Inventors: Dong-Hoon Yoo, Suwon-si (KR); Hee Seok Kim, Seoul (KR); Jeong Wook Kim, Seongnam-si (KR); Soo Jung Ryu, Cheonan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1455 days.

(21) Appl. No.: 11/492,974

(22) Filed: Jul. 26, 2006

(65) Prior Publication Data
US 2007/0169044 A1 Jul. 19, 2007

(30) Foreign Application Priority Data
Jan. 19, 2006 (KR) .................. 10-2006-0005619

(51) Int. Cl.
*G06F 9/45* (2006.01)

(52) U.S. Cl. ........................................... 717/150
(58) Field of Classification Search .............. 717/150
See application file for complete search history.

(56) References Cited

U.S. PATENT DOCUMENTS

| | | | |
|---|---|---|---|
| 6,035,125 A * | 3/2000 | Nguyen et al. ........ | 717/160 |
| 6,173,443 B1 * | 1/2001 | Wakatani ............... | 717/160 |
| 6,634,024 B2 * | 10/2003 | Tirumalai et al. ..... | 717/161 |
| 6,732,354 B2 * | 5/2004 | Ebeling et al. ........ | 717/119 |
| 7,263,692 B2 * | 8/2007 | Muthukumar et al. ... | 717/150 |
| 2004/0268334 A1 * | 12/2004 | Muthukumar et al. ... | 717/160 |
| 2006/0036413 A1 * | 2/2006 | Campbell et al. ..... | 703/2 |

* cited by examiner

*Primary Examiner* — John Chavis
(74) *Attorney, Agent, or Firm* — Sughrue Mion, PLLC

(57) ABSTRACT

An apparatus and a method for processing an array in a loop in a computer system, including: applying loop unrolling to a multi-dimensional array included in a loop based on a predetermined unrolling factor to generate a plurality of unrolled multi-dimensional arrays; and transforming each of the plurality of unrolled multi-dimensional arrays into a one-dimensional array having an array subscript expression in a form of an affine function with respect to a loop counter variable.

23 Claims, 7 Drawing Sheets

FIG. 4A

- A[ i ][ j ]
  1. LINEARIZATION : A[ i ][ j ] = A[ 8×i+j ]
  2. SIMPLIFICATION
     - SUFFIX = 0  MOD 4 = 0
     - 8' = ROUND_DOWN (8 × 1 / 4) = 2
     - 1' = ROUND_DOWN (1 × 4 / 4) = 1
     - $A_0$[ 2×$LC_i$ + $LC_j$ ]

FIG. 4B

- A[i][j+1]
  1. LINEARIZATION : A[ i ][ j+1 ] = A[ 8×i+j+1 ]
  2. SIMPLIFICATION
     - SUFFIX = 1  MOD 4 = 1
     - 8' = ROUND_DOWN (8 × 1 / 4) = 2
     - 1' = ROUND_DOWN (1 × 4 / 4) = 1
     - $1_c$' = ROUND_DOWN (1 / 4) = 0
     - $A_1$[ 2×$LC_i$ + $LC_j$ ]

WHEN $i = 0$, $j = 0$ ( $LC_i = 0, LC_j = 0$ )

FIG. 5B $$A[1][4] = A_0[3]$$
$$A[1][5] = A_1[3]$$
$$A[1][6] = A_2[3]$$
$$A[1][7] = A_3[3]$$

WHEN $i = 1$, $j = 4$ ( $LC_i = 1, LC_j = 1$ )

METHOD AND APPARATUS FOR EFFICIENTLY PROCESSING ARRAY OPERATION IN COMPUTER SYSTEM

CROSS-REFERENCE TO RELATED APPLICATIONS

This application claims the benefit of priority from Korean Patent Application No. 10-2006-0005619, filed on Jan. 19, 2006, in the Korean Intellectual Property Office, the disclosure of which is incorporated herein by reference.

BACKGROUND OF THE INVENTION

1. Field of the Invention

Methods and apparatuses consistent with the present invention relate to high performance memory systems, and more particularly, to efficiently performing calculation of a memory bank and an offset of an array variable included in a loop.

2. Description of the Related Art

Technologies using memory parallelism are vigorously proposed as a method of realizing a high performance memory system. The memory parallelism is generally performed by increasing a number of memory data capable of being simultaneously accessed using memory interleaving in a system having multiple memory banks. The memory interleaving is a technology for improving access performance by distributing data to the multiple memory banks so that parallel access to the multiple memory banks is possible. In this case, a number of memory banks used in interleaving is designated as an interleaving factor (IF).

FIGS. 1A and 1B illustrate loop unrolling and memory interleaving. Referring to FIG. 1A, a memory includes four banks. Accordingly, data stored in a memory bank 0, a memory bank 1, a memory bank 2, and a memory bank 3 may be simultaneously accessed by a processor. Therefore, in comparison to a case where the memory interleaving is not used, a memory access speed may improve as much as four times. Since a number of the memory banks used in the memory interleaving in FIGS. 1A and 1B is four, an interleaving factor (IF) is four.

Also, as shown in FIGS. 1A and 1B, in the case of an array used in a loop, an effect of the memory parallelism may be improved by performing the loop unrolling. The loop unrolling is a method of reducing a number of iterations of the loop by copying a body part of the loop several times so that the copied body parts may be performed at same time. In FIG. 1A, the loop is repeated 32 times. However, in FIG. 1B, an original code 110 shown in FIG. 1A is converted into a new code 120 by the loop unrolling. In the case of the new code 120, a total calculation is finished when the loop is repeated eight times. Due to the memory interleaving, since only one loop may be performed at a time, the new code 120 may be more quickly performed than the original code 110. An array element calculation in a loop included in the original code 110 is reproduced as four array element calculations in the new code 120. As described above, a value associated with how many times array element calculations included in the loop are reproduced in the loop unrolling is designated as an unrolling factor (UF). In FIG. 1B, since an operation "A[i]=", which is included in the loop, is unrolled to four operations as "A[i+0]=", "A[i+1]=", "A[i+2]=", and "A[i+3], the unrolling factor is four.

In FIGS. 1A and 1B, to locate an A[i] value, the memory bank storing the A[i] value and an offset in the memory bank have to be calculated. Generally, the memory bank may be obtained by modulo operation of an index of an array by a number of the memory banks. For example, in order to detect the memory bank in which A[7] is located, 7 (an index of A[7]) is used for a modulo operation along with the number of the memory banks, which is 4 in a given example. Then, a result value becomes 3, and A[7] is located in the memory bank 3. Also, where, in the memory bank 3, A[7] is located has to be determined. Generally, the offset in the memory bank may be obtained by dividing the index of the array by the number of the memory banks. For example, when dividing seven (the index of A[7]) by 4 (the number of the memory banks in FIGS. 1A and 1B), since a quotient is 1, the offset in the memory bank 3 of A[7] becomes 1.

As described above, an array used in a loop has an overhead of calculating the memory bank to be accessed and corresponding offsets, every time. In a conventional architecture, the memory address calculation is performed in real time by a software in a processor or by a special-purpose hardware, for example, an address calculation unit. However, when using the software, a performance speed is slow, and when using the special-purpose hardware, a hardware cost is high. Also, calculation costs of a modulo operation and a division operation used for calculating the memory address in memory interleaving are high regardless of using the special-purpose hardware or the software.

Particularly, in the case of a reconfigurable architecture previously proposed, since memory address calculation is directly mapped to a reconfigurable hardware, a cost of hardware for the memory address calculation is very high. The reconfigurable architecture can be customized to solve any problem after device fabrication or can exploit a large degree of spatially customized calculations in order to perform their calculation. A field programmable gate array (FPGA) that includes lines for connecting a plurality of arithmetic logic units (ALUs), may embody the reconfigurable architecture. For example, if the FPGA is customized to be capable of calculating an operation "A*x*x+B*X+C", the operation may be repeated very quickly. Accordingly, the reconfigurable architecture is very capable for processing a loop operation. Also, the lines connecting the ALUs may be changed in a configuration by applying a certain current. As described above, an architecture that can perform a new operation by changing a hardware configuration after fabrication is designated as a reconfigurable architecture. A reconfigurable architecture in which data is inputted to one array element one bit at a time is designated as a fine grained array (FGA). A reconfigurable architecture in which data is inputted to one array element one word at a time is designated as a coarse grained array (CGA).

Accordingly, when processing an array in a loop, a method for efficiently calculating a location and/or position in a memory in which the array is stored is required. The term position is used herewith throughout the specification. The term position also encompasses a location in a memory.

SUMMARY OF THE INVENTION

Exemplary embodiments of the present invention may overcome the above disadvantages and other disadvantages not described above. The present invention is not necessarily required to overcome any of the disadvantages described above, and the exemplary embodiments of the present invention may not overcome any of the problems described above. The appended claims should be consulted to ascertain the true scope of the invention.

The present invention provides a method for efficiently calculating a position in a memory, in which an array is stored, when using memory interleaving and loop unrolling. Particularly, when calculating a position in a memory in which an array is stored at a run time, an address calculation is possible without using a modulo operation and division operation.

The present invention also provides a method capable of calculating a position in a memory in which an array is stored by a simple operation, though using a memory interleaving and a loop unrolling.

The present invention also provides a method capable of reducing an overhead of a memory address calculation when accessing a memory, by optimizing an array subscript expression at a compiling time when memory interleaving is used in a multiple memory banks.

According to an aspect of the present invention, there is provided a method for processing an array in a loop in a computer system, including: applying a loop unrolling to a multi-dimensional array included in a loop based on a predetermined unrolling factor to generate a plurality of unrolled multi-dimensional arrays; and transforming each of the plurality of unrolled multi-dimensional arrays into a one-dimensional array having an array subscript expression in a form of an affine function with respect to a loop counter variable.

The operation of transforming each of the plurality of unrolled multi-dimensional arrays into one-dimensional array includes: generating a stride $S_i$ by $A_i*ED_i$, where $A_i$ is a factor of an ith array index variable of the unrolled multi-dimensional array, and $ED_i$ is an effective dimension value for the ith array index variable of the array subscript expression of the one-dimensional array; generating a constant term C by summing of values of $B_i*ED_i$ for all i, where $B_i$ is a constant term of the ith array index variable of the unrolled multi-dimensional array, and $ED_i$ is the effective dimension value for the ith array index variable of the array subscript expression of the one-dimensional array; and generating the array subscript expression of the one-dimensional array by using the stride $S_i$ for a stride of the ith array index variable of the array subscript expression of the one-dimensional array and the constant term C for a constant term of the array subscript expression.

According to another aspect of the present invention, there is provided a method of processing an array in a loop in a computer system, including: generating a new stride $S'_i$ for an ith loop counter variable by rounding the value of $S_i*UF/IF$, where $S_i$ is a stride of the ith array index variable of an array subscript expression of the array, UF is a predetermined unrolling factor, and IF is a predetermined interleaving factor; generating a new constant term C' by rounding the value of C/IF, where C is a constant term of the array subscript expression of the array and IF is the predetermined interleaving factor; and changing the array index variable of the array subscript expression into the loop counter variable and transforming the array subscript expression of the array into a new array subscript expression using the new stride and the new constant term. The method further includes: generating a memory bank number by C modulo IF, where C is the constant term of the array subscript expression and IF is the predetermined interleaving factor; and transforming the array included in the loop into an array using the memory bank number.

According to another aspect of the present invention, there is provided a computer readable recording medium in which a program for executing a method for processing an array in a loop in a computer system is recorded, the method comprising: applying a loop unrolling to a multi-dimensional array included in a loop based on a predetermined unrolling factor to generate a plurality of unrolled multi-dimensional arrays; and transforming each of the plurality of unrolled multi-dimensional arrays into a one-dimensional array having an array subscript expression in a form of an affine function with respect to a loop counter variable.

According to another aspect of the present invention, there is provided a computing apparatus comprising a loop unroller that applies a loop unrolling to a multi-dimensional array included in a loop based on a predetermined unrolling factor to generate a plurality of unrolled multi-dimensional arrays, and an array transformer that transforms each of the plurality of unrolled multi-dimensional arrays into a one-dimensional array having an array subscript expression in a form of an affine function with respect to a loop counter variable.

BRIEF DESCRIPTION OF THE DRAWINGS

The above and/or other aspects of the present invention will become apparent and more readily appreciated from the following detailed description of exemplary embodiments, taken in conjunction with the accompanying drawings, in which:

FIGS. 4A-4C are diagrams illustrating examples of linearizing and simplifying arrays according to an exemplary embodiment of the present invention;

FIGS. 5A and 5B are diagrams illustrating original arrays and arrays made by changing the original arrays according to an exemplary embodiment of the present invention;

DETAILED DESCRIPTION OF EXEMPLARY EMBODIMENTS

Exemplary embodiments of the present invention will be described in greater detail with reference to the accompanying drawings. In the following detailed description, same drawing references are used to denote analogous elements even in different drawings. The matters described in the description such as a detailed construction and elements are only provided to assist in a comprehensive understanding of the inventive concept and not by way of a limitation. Thus, it is apparent that the present invention can be carried out without those described matters. Also, well-known functions or constructions are not described in detail to prevent obscuring the inventive concept in unnecessary details.

Figure 2:
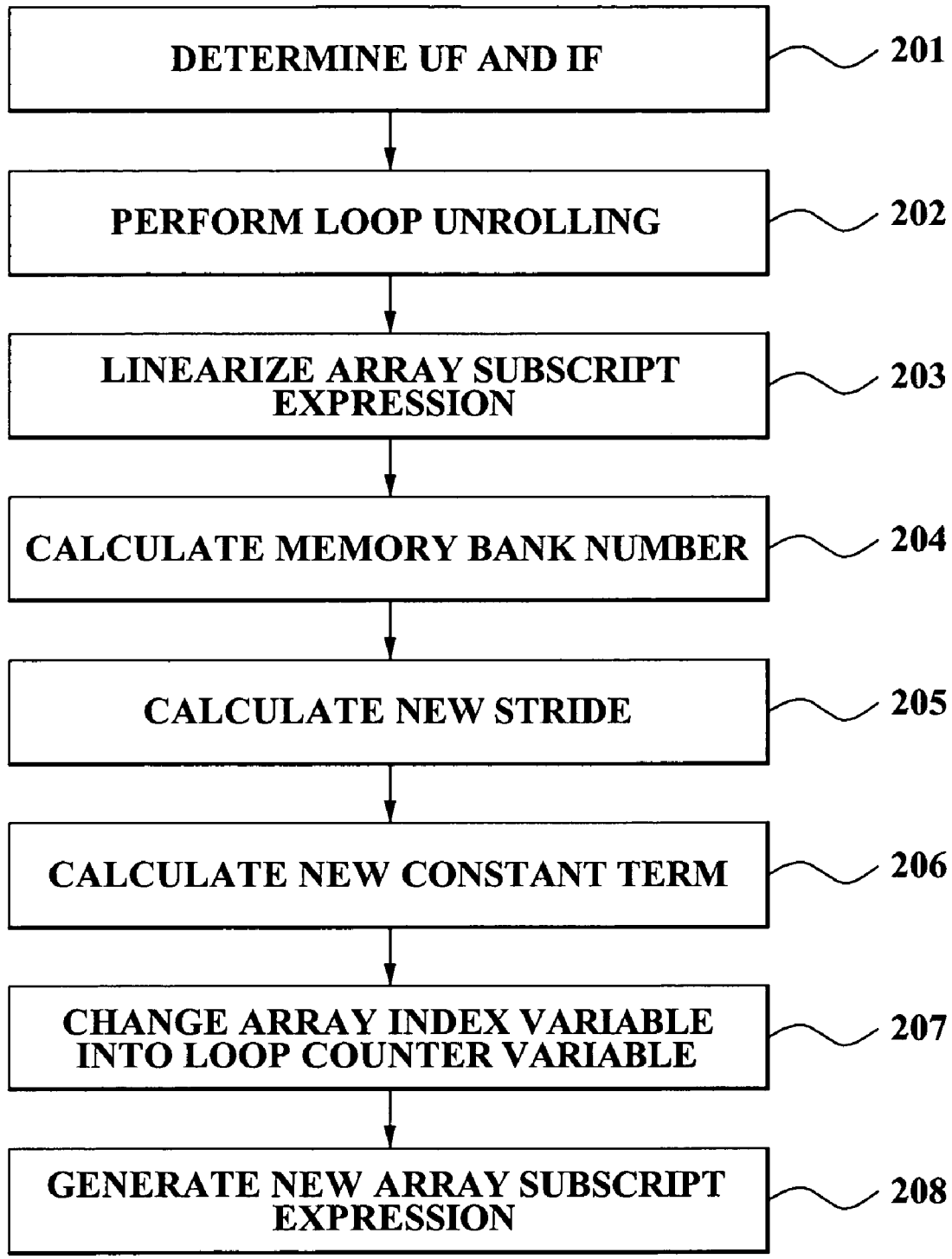
FIG. 2 is a flowchart illustrating a method of processing an array in a loop, according to an exemplary embodiment of the present invention.
Figure 3:
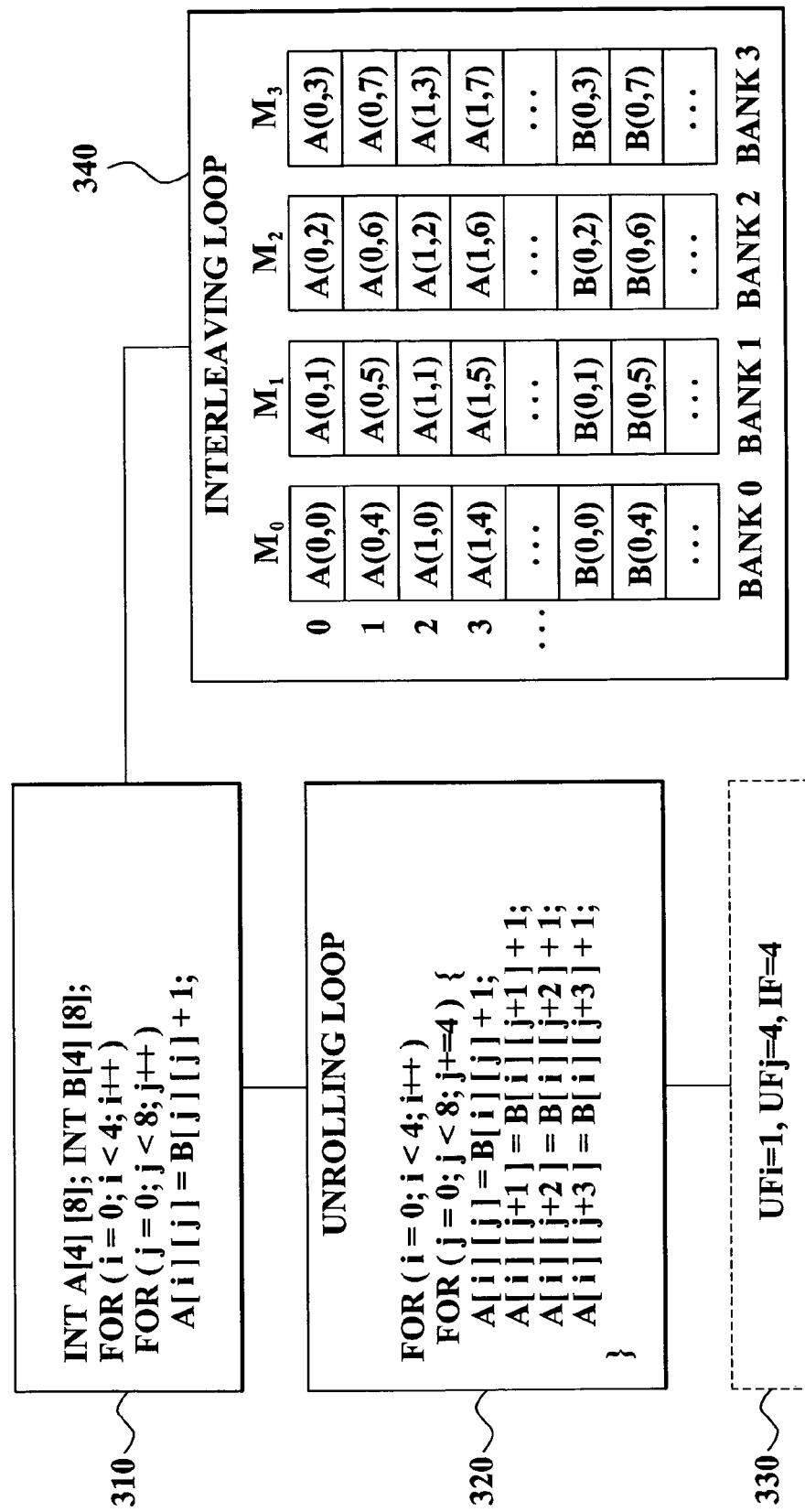
FIG. 3 is a diagram illustrating loop unrolling according to an exemplary embodiment of the present invention.

FIG. 2 is a flowchart illustrating a method of processing an array in a loop according to another embodiment of the present invention. In operation 201, a computing apparatus determines an unrolling factor (UF) for unrolling an array included in a loop. Also, an interleaving factor (IF) is determined. The unrolling factor (UF) and the interleaving factor (IF) may be determined by a programmer. For example, in code block 320 of FIG. 3, with respect to an array in a loop 310 of FIG. 3, the loop unrolling is performed while an unrolling factor UFi with respect to i is 1 and an unrolling factor UFj with respect to j is 4. When an unrolling factor is 1, it is identical to a case where a loop is not unrolled. With respect to the loop 310 of FIG. 3, the loop unrolling may be performed while the unrolling factor $UF_j$ with respect to j is 5. In other words, since, in a second iteration of the second loop (where i=0; and j>4), A[0][5], A[0][6], and A[0][7] have an operation corresponding to an original program but A[0][8] and A[0][9] do not have a corresponding operation, an operation may be not performed with respect to A[0][8] and A[0][9] in a last loop. That is, in the second loop, j is only incremented to 7. Also, according to another embodiment of the present invention, a divisor of a maximum value of each array element may be selected as an unrolling factor. For example, as the UFi, an unrolling factor may be selected from 1, 2, and 4, which are divisors of 4, which is a maximum value of array element i. An interleaving factor (IF) is a number of memory banks used in interleaving. In FIG. 3, since a number of memory banks used in the interleaving is 4 (as depicted in block 340), an interleaving factor (IF) is 4 (as depicted in block 330).

In operation 202, a loop unroller of the computing apparatus, at a compiling time, applies a loop unrolling to an array included in a loop of the input programs, based on the predetermined unrolling factor, to generate a plurality of unrolled arrays. The array may be a multi-dimensional array and the plurality of unrolled arrays may be a plurality of unrolled multi-dimensional arrays. An example of the loop unrolling according to an embodiment of the present invention is shown in code block 320 of FIG. 3.

In operation 203, an array transformer of the computing apparatus linearizes an array subscript expression. That is, the array transformer transforms each of the plurality of unrolled multi-dimensional arrays into a one-dimensional array having an array subscript expression in a form of an affine function with respect to a loop counter variable.

The array transformer generates a stride Si by Ai*EDi, where Ai is a factor of an ith array index variable of the unrolled multi-dimensional array, and EDi is an effective dimension value for the ith array index variable of the array subscript expression of the one-dimensional array. And then, the array transformer generates a constant term C by summing of values of Bi*EDi for all i, where Bi is a constant term of the ith array index variable of the unrolled multi-dimensional array, and EDi is the effective dimension value for the ith array index variable of the array subscript expression of the one-dimensional array. Then, the array transformer generates the array subscript expression of the one-dimensional array by using the stride Si for a stride of the ith array index variable of the array subscript expression of the one-dimensional array and the constant term C for a constant term of the array subscript expression. A concrete example of these operations is provided below.

When the array is not a multi-dimensional array, operation 203 may be skipped.

A linearization formula is defined in Equation 1.

$$\begin{aligned}A[A_1L_1 + B_1]\ldots\\[A_nL_n + B_n]\end{aligned} = A[(A_1 \times ED_1) \times L_1 + \ldots +$$
$$(A_n \times ED_n) \times L_n + B_1 \times ED_1 + \ldots +$$
$$B_n \times ED_n]$$
$$= A[S_i \times L_1 + \ldots + S_n \times L_n + C]$$

Equation 1

$S_i$: stride of index variable $L_i$ $C$: constant term

In Equation 1, $L_1, L_2, \ldots,$ and $L_n$ are array index variables. A[i][j], A[i][j+1], A[i][j+2], and A[i][j+3] of 320 in FIG. 3, which are loop-unrolled arrays, are linearized. First, A[i][j] is linearized. Since the array index variables are "i" and "j," $L_1$ and $L_2$ in the Equation 1 are "i" and "j," respectively. Also, since $A_1$ and $A_2$ are coefficients of array index variables in an original multi-dimensional array, $A_1$ and $A_2$ in A[i][j] are 1 and 1, respectively.

In Equation 1, $ED_1, ED_2, \ldots,$ and $ED_n$ indicate effective dimension values. The effective dimension value EDi for an ith array index variable is obtained by multiplying maximum indexes of all the subsequent dimensions of the unrolled multi-dimensional array. For example, a size of an array of A[i][j] is assumed to be A[4][8]. Since $ED_1$ is an effective dimension value of the first array index variable "i," the $ED_1$ is calculated by multiplying maximum indexes of all the subsequent dimensions. In this case, the maximum index of the subsequent dimensions is "8," which is the maximum index of the index variable "j." "j" is all the subsequent dimensions of the first array index variable "i." Since the maximum index of "j" is 8, $ED_1$ is 8. $ED_2$ (the effective dimension value of the second array index variable "j") is 1, since there are no other subsequent dimensions.

In A[i][j], constant values with respect to the array index variables "i" and "j" are 0 and 0, respectively. A linearized one-dimensional array obtained from Equation 1 by reflecting the above described calculation is A[8*i+j]. Namely, $S_i$ that is a stride with respect to "I" becomes $(A_1 * ED_1) = (1 * 8) = 8$. $S_j$ that is a stride with respect to "j" becomes $(A_2 * ED_2) = (1*1) = 1$. The constant term becomes $(B_1 * ED_1 + B_2 * ED_2) = (0*8+0*1) = 0$. Accordingly, in FIG. 4A, an expression of A[i][j] is linearized into A[8*i+j].

Referring to FIG. 4B, linearizing A[i][j+1] is described. Since the array index variables are "i" and "j," $L_1$ and $L_2$ are i and j, respectively, in the Equation 1. Also, since $A_1$ and $A_2$ are coefficients of array index variables in the original multi-dimensional array, $A_1$ and $A_2$ in A[i][j+1] are 1 and 1, respectively.

Since the size of the array is A[4][8] in A[i][j+1] and $ED_1$ is the effective dimension value with respect to the array index variable i, $ED_1$ is calculated by multiplication of the maximum index of the subsequent dimension, "j." Since the maximum index of j is 8, $ED_1$ is 8. $ED_2$ is the effective dimension value with respect to the array variable j. However, the array variable j has no subsequent dimension. The effective dimension value for this case is 1. Thus, $ED_2$ is 1.

In A[i][j+1], constant values with respect to the array index variables "i" and "j" are 0 and 1, respectively. A linearized one-dimensional array obtained from the Equation 1 by reflecting the above described calculation is A[8*i+j+1].

Namely, $S_i$ that is a stride with respect to "i" becomes $(A_1*ED_1)=(1*8)=8$. $S_j$ that is a stride with respect to "j" becomes $(A_2*ED_2)=(1*1)=1$. The constant term becomes $(B_1*ED_1+B_2*ED_2)=(0*8+1*1)=1$. Accordingly, in FIG. 4B, an expression of A[i][j+1] is linearized into be A[8i+j+1]. Similarly, A[1][j+2] and A[1][j+3] are linearized into A[8i+j+2] and A[8i+j+3], respectively, as depicted in FIG. 4C.

In operation 204, the computing apparatus calculates a memory bank number in which a corresponding array will be stored. The computing apparatus generates a memory bank number by C modulo IF, where C is the constant term of the array subscript expression and IF is the predetermined interleaving factor.

Figure 1A:
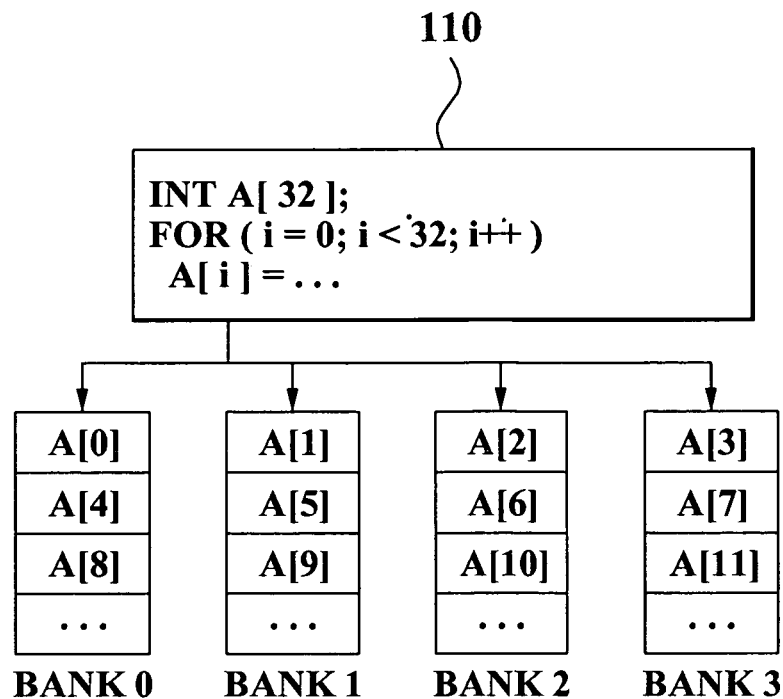
FIGS. 1A and 1B are diagrams illustrating loop unrolling and memory interleaving according to techniques in a related art.

An example according to an exemplary embodiment of the present invention will be described with reference to FIGS. 3 and 4A-C. In the case of A[8i+j] generated by linearizing A[i][j], an array subscript expression is "8i+j" and the constant term is "0" from the array subscript expression. Also, the interleaving factor IF in FIG. 3 is 4. Accordingly, when the constant term of the array subscript expression is modulo-operated by IF, 0 mod 4=0, as shown in FIG. 4A, 1 mod 4=1, as shown in FIG. 4B. Namely, A[8i+j] is stored in the memory bank 0 and A[8i+j+1] is stored in the memory bank 1. Similarly, A[8i+j+2] generated by linearizing A[1][j+2] is "2 mod 4=2" and is stored in the memory bank 2. A[8i+j+3] generated by linearizing A[1][j+3] is "3 mod 4=3" and is stored in the memory bank 3.

In operation 205, the array transformer calculates a new stride. The array transformer generates a new stride S'i for ith loop counter variable by rounding the value of Si*UF/IF, where Si is the stride of the ith array index variable of the array subscript expression of the one-dimensional array, UF is the predetermined unrolling factor, and IF is a predetermined interleaving factor.

An example according to an exemplary embodiment of the present invention will be described with reference to FIGS. 3 and 4A-C. In the case of A[8i+j] made by linearizing A[i][j], the array subscript expression is "8i+j" and a stride with respect to the array index variable "i" from the array subscript expression is 8. Also, the unrolling factor UFi with respect to the array index variable "i" is 1 and the IF is 4 in FIG. 3. Accordingly, from the array subscript expression, an integer is calculated from a result value of multiplying the stride by the UF and dividing by a predetermined IF, "ROUND_DOWN (8*¼)=2", as shown in FIG. 4A. ROUND_DOWN indicates a round-down operation. Next, in A[8i+j], a new stride with respect to the array index variable "j" is calculated. In FIG. 3, the stride with respect to the array index variable j is 1. UFj with respect to the array index variable j is four, and IF with respect to the array index variable j is four. Accordingly, from the array subscript expression, an integer is calculated from a result value of multiplying the stride by the UF and dividing by a predetermined IF, "ROUND_DOWN (1*4/4)=1", as shown in FIG. 4A. Namely, in A[8i+j], a new stride with respect to the array index variable j is one.

In the case of A[8i+j+1] made by linearizing A[i][j+1], the array subscript expression is "8i+j+1." From the array subscript expression, the stride with respect to the array index variable i is 8, and the stride with respect to the array index variable j is one. Also, UFi with respect to the array index variable i is 1, and IF is four, as set forth in FIG. 3. Accordingly, a new stride with respect to the array index variable i is two, and a new stride with respect to the array index variable j is 1, as shown in FIG. 4B.

Similarly, in the cases of A[8i+j+2] made by linearizing A[i][j+2] and A[8i+j+3] made by linearizing A[i][j+3], a new stride with respect to the array index variable i is 2 and a new stride with respect to the array index variable j is 1, as shown in FIG. 4C.

In 206, the array transformer calculates a new constant term. The array transformer generates a new constant term C' by rounding the value of C/IF, where C is the constant term of the array subscript expression of the one-dimensional array and IF is the predetermined interleaving factor.

An example according to an exemplary embodiment of the present invention will be described with reference to FIGS. 3 and 4A-C. In the case of A[8i+j] made by linearizing A[i][j], an array subscript expression is "8i+j" and the constant term is "0" from the array subscript expression. Also, IF in FIG. 3 is 4. Accordingly, an integer is calculated from a result value of dividing the constant term by a predetermined IF from the array subscript expression, "ROUND_DOWN (0/4)=0". Namely, the new constant term is 0.

Similarly, in the case of A[8i+j+1] made by linearizing A[i][j+1], the array subscript expression is "8i+j+1" and the constant term of the array subscript expression is 1. Also, in FIG. 3, IF is 4. Accordingly, an integer is calculated from a result value of dividing the constant term by a predetermined IF from the array subscript expression, "ROUND_DOWN (¼)=0". Namely, a new constant term is 0. Similarly, in the cases of A[8i+j+2] made by linearizing A[i][[j+2] and A[8i+j+3] made by linearizing A[i][j+3], new constant terms are 0.

Figure 1B:
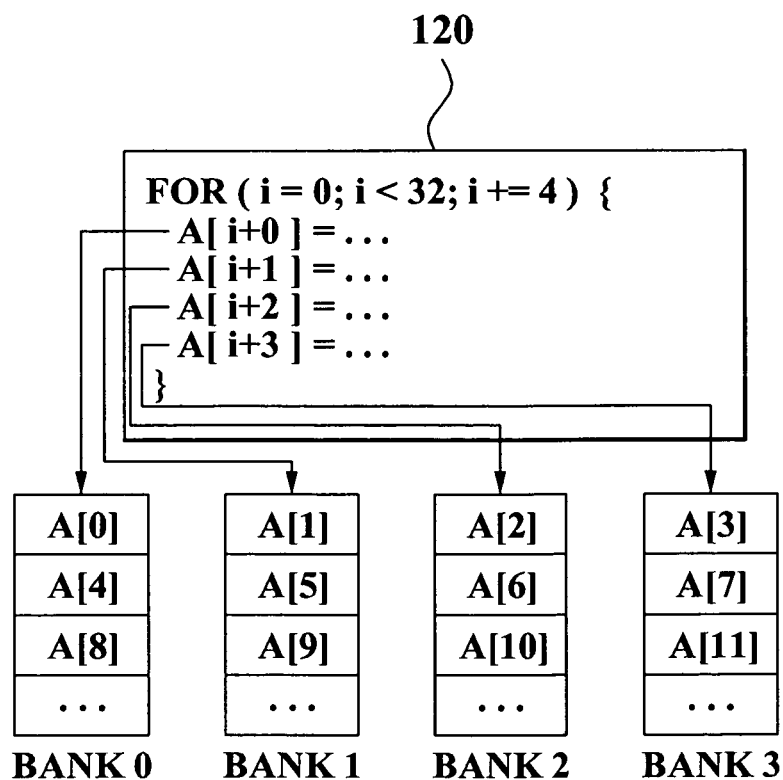

In operation 207, the array transformer changes the array index variables into loop counter variables. The loop counter variable indicates a number of actual iterations of the loop while the loop is executing. A loop index is a variable varying during the performance of the loop. For example, i in FIG. 1B is a loop index because i varies while the loop is executed. When i=4 in FIG. 1B, this does not indicate the number of actual iterations of the loop. The number of actual iterations of the loop is 2 when i=4 in FIG. 1B. The loop counter variable indicates the number of actual iterations of the loop that may be different from the loop index. In FIG. 3, the array index variables i and j are changed into the loop counter variables $LC_i$ and $LC_j$.

In operation 208, the array transformer generates a new array subscript expression. The array transformer changes the one-dimensional array included in the loop operation into an array using the memory bank number and transforms the array subscript expression of the one-dimensional array into an array subscript expression using the new stride and the new constant term.

An example according to an exemplary embodiment of the present invention described with reference to FIGS. 3 and 4A-C. In the case of A[8i+j] made by linearizing A[i][j], the memory bank number calculated in operation 204 is "0." The new stride with respect to the loop counter variable $LC_i$ (or the array index variable i), is "2" and the new stride with respect to the loop counter variable $LC_j$ (or the array index variable j) is "1", which are calculated in operation 205. The new constant term calculated in operation 206 is "0." Accordingly, since "$2*LC_i+LC_j$" and the memory bank number is "0", the new array subscript expression may be shown as $A_0[2*LC_i+LC_j]$, as shown in FIG. 4A.

In the case of A[8i+j+1] made by linearizing A[i][j+1], the memory bank number calculated in operation 204 is "1". The new stride with respect to the loop counter variable $LC_i$ is "2" and the new stride with respect to the loop counter variable $LC_j$ is "1", which is calculated in operation 205. The new constant term calculated in operation 206 is "0". Accordingly, since "$2*LC_i+LC_j$" and the memory bank number is "1", the new array subscript expression may be shown as $A_1[2*LC_i+LC_j]$, as shown in FIG. 4B.

Similarly, A[8i+j+2] made by linearizing A[i][j+2] and A[8i+j+3] made by linearizing A[i][j+3] may be shown as $A_2[2*LC_i+LC_i]$ and $A_3[2*LCi+LC_j]$, respectively, as shown in FIG. 4C.

Namely, according to an exemplary embodiment of the present invention, the memory bank in which the array index variable is located may be calculated from the constant term of the array index variable as well as the array subscript expression, and these calculations become simplified, and do not require waiting for the calculation of the array subscript expression to be completed.

Operations 204 through 208 may be called as simplification. Equation 2 illustrates an exemplary equation with respect to the simplification.

$$A_{suffix}[S_1 \times L_1 + \ldots + S_n \times L_n + C] \rightarrow A_{suffix}[S_i' \times LC_i + \ldots + S_i' \times LC_n + C']$$

$$S_i' = \text{ROUND\_DOWN}(S_i \times UF_i/IF)$$

$$C' = \text{ROUND\_DOWN}(C/IF)$$

$LC_i$=loop counter of index variable $L_i$

Equation 2

In the Equation 2, $L_1, L_2, \ldots,$ and $L_n$ are array index variables and $LC_1, LC_2, \ldots,$ and $LC_n$ are loop counter variables corresponding to the array index variables, respectively. $S_i$ is a stride of an array index variable $L_i$, and C is a constant term included in an array subscript expression before becoming simplified. $S_i'$ is a stride of a loop counter variable $LC_i$, and C' is a constant term of an array subscript expression after becoming simplified. IF is an interleaving factor, and the C' may be obtained by "ROUND_DOWN(C/IF)." $UF_i$ is an unrolling factor with respect to the array index variable $L_i$. $S_i'$ may be calculated by "ROUND_DOWN $(S_i*UF_i/IF)$."

FIG. 5 is a diagram illustrating original arrays and arrays made by changing the original arrays according to an exemplary embodiment of the present invention. FIG. 5A illustrates, when i=0 and j=0, an offset of a memory bank in which each of A[i][j] is stored according to an exemplary embodiment of the present invention. FIG. 5B illustrates, when i=1 and j=4, an offset of a memory bank in which each of A[i][j] is stored according to an exemplary embodiment of the present invention. Since a loop is performed according to $LC_i$ and $LC_j$, which are loop counter variables while performing an actual loop and the loop counter variable is a counter indicating a number of actual iterations of the loop, the loop counter variable may be embodied by a simple counter. Since a counter incrementing by one is a device very easily embodied, if an exemplary embodiment of the present invention is applied to a reconfigurable architecture, the array subscript expression can be calculated with very little calculation cost.

Figure 6:
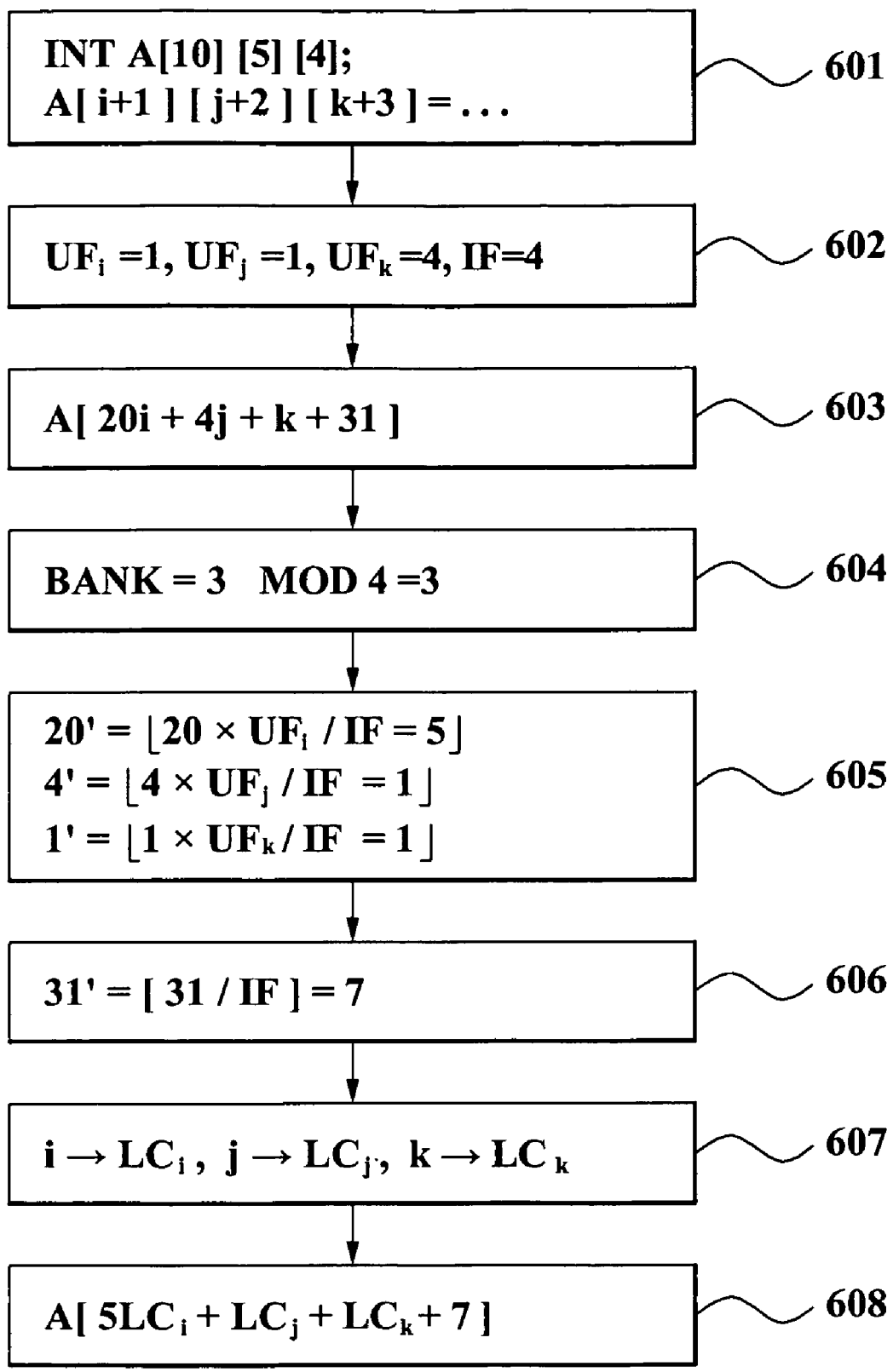
FIG. 6 is a diagram illustrating an example of simplifying an array subscript expression of an array according to an exemplary embodiment of the present invention.

FIG. 6 is a diagram illustrating an example of simplifying an array subscript expression of an array, according to an exemplary embodiment of the present invention.

$UF_i$, $UF_j$, $UF_k$, and IF of a multi-dimensional array A[i+1][j+2][k+3] shown in FIG. 6 are assumed to be 1, 1, 4, and 4 (refer to operations 601 and 602). The multi-dimensional array A[i+1][j+2][k+3] is linearized into A[20i+4j+k+31] (refer to operation 603). To describe the linearization in more detail, since array index variables are i, j, and k, $L_1$, $L_2$, and $L_3$ in the Equation 1 are i, j, and k, respectively. Also, since $A_1$, $A_2$, and $A_3$ are coefficients of array index variables of an original multi-dimensional array, $A_1$, $A_2$, and $A_3$ in A[i+1][j+2][k+3] are 1, 1, and 1, respectively.

In the Equation 1, $ED_1, ED_2, \ldots,$ and $ED_3$ indicate effective dimension values for the ith array index variables which are obtained by multiplying maximum indexes of all the subsequent dimensions of the unrolled multi-dimensional array. For example, in A[i+1][j+2][k+3], a size of the array is assumed to be A[10][5][4]. Since $ED_1$ is the effective dimension value for the first array index variable "i", the $ED_1$ is obtained by multiplying maximum indexes of the subsequent dimensions "j" and "k". Since the maximum index of "j" is 5 and the maximum index of "k" is 4, $ED_1$ is 5*4=20. Since $ED_2$ is the effective dimension value for the second array index variable "j", the $ED_2$ is obtained by the maximum index of the subsequent index variable "k". Since the maximum index of the "k" is 4, $ED_2$ is 4. Since $ED_3$ is the effective dimension value for the last array index variable "k", there is no subsequent dimension index variable. In this case, the effective dimension value is determined to be 1. Accordingly, $ED_3$ is 1.

Constant values with respect to the array index variables i, j, and k in A[i+1][j+2][k+3] are 1, 2, and 3, respectively.

The one-dimensional array linearized in the Equation 1 by reflecting the above described calculation becomes A[20i+4j+k+31]. Namely, Si that is a stride with respect to i becomes $Si=(A_1*ED_1)=(1*20)=20$. Sj that is a stride with respect to j becomes $Sj=(A_2*ED_2)=(1*4)=4$. $S_k$ that is a stride with respect to k becomes $S_k=(A_3*ED_3)=(1*1)=1$. A constant term becomes $(B_1*ED_1+B_2+ED_2+B_3+ED_3)=(1*20+2*4+3*1)=31$. Accordingly, in FIG. 6, A[i+1][j+2][k+3] is linearized into A[20i+4j+k+31].

The computing apparatus generates a memory bank number by C modulo IF, in which C is the constant term of the array subscript expression and IF is the predetermined interleaving factor. In 604, A[20i+4j+k+31] is stored in the memory bank 3.

Also, the simplification described above is performed and the array subscript expression is simplified into "$5LC_i+LC_j+LC_k+7$" (refer to 605, 606, 607, and 608). Specifically, to further simplify the array subscript expression, in operation 605: the strides are simplified (20*¼=5, 4*¼=1, and 1*¼=1). In operation 606, the constant term is simplified (31/4=7). In operation 607, i, j, and k are equated to $LC_i$, $LC_j$, and $LC_k$ respectively. Accordingly, in operation 608, the simplified array subscript expression is obtained ($5LC_i+LC_j+LC_k+7$).

Figure 7A:
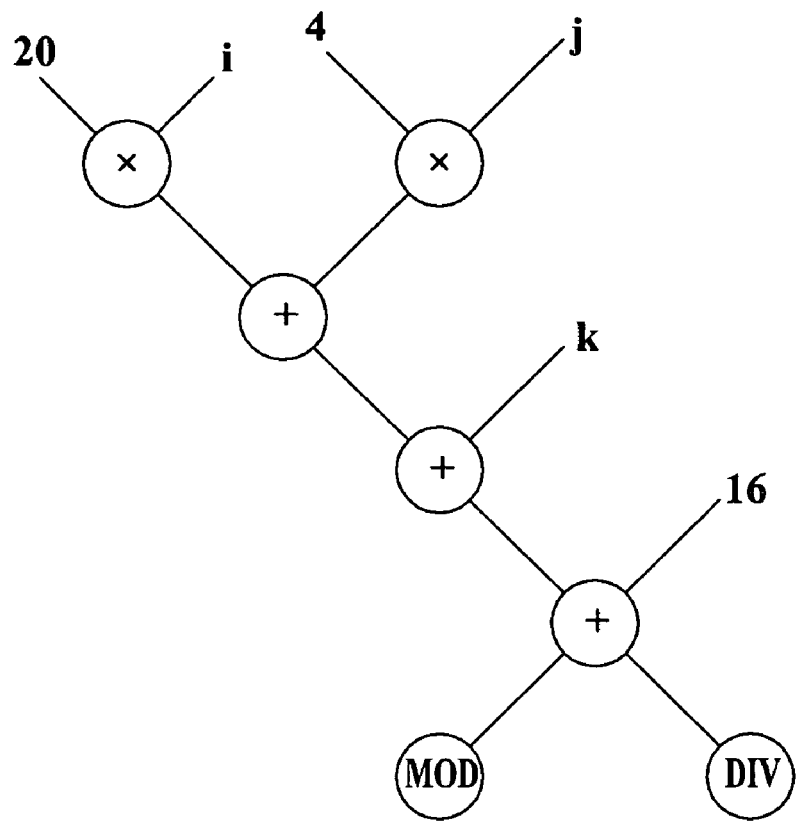
FIG. 7A and 7B are diagrams illustrating performing the array subscript expression by a simple operation according to an exemplary embodiment of the present invention.
Figure 7B:
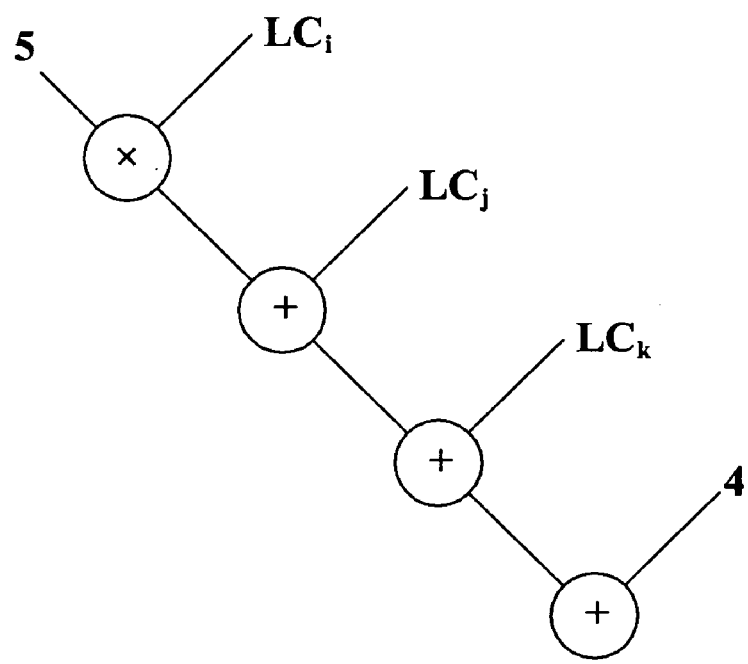

FIG. 7A is a diagram illustrating operations in the related art techniques and FIG. 7B is a diagram illustrating operations in an exemplary embodiment of the present invention. FIG. 7B is a diagram illustrating that the array subscript expression generated according to an exemplary embodiment of the present invention is performed by a simple operation.

Referring to FIG. 6, when only the linearization is performed, the array subscript expression has to be calculated to determine where the array A[20i+4j+k+31] is located. Namely, "20i+4j+k+31" has to be calculated. To embody this by a reconfigurable architecture, as shown in FIG. 7A, two multiplication operations, three add operations, one modulo operation, and one division operation are required. These operations have to be performed for every iteration of a loop, while the loop is executed. Particularly, even though the modulo operation and the division operation may be performed by using software, many processor cycles are required and calculation costs are high. Also, even though the modulo operation and the division operation may be embodied by hardware, many transistors are required.

However, according to an exemplary embodiment of the present invention, the array subscript expression is simplified into "$5LC_i+LC_j+LC_k+7$". As shown in FIG. 7B, one multiplication operation and three add operations are sufficient for calculating an offset. Namely, by the simplification according to an embodiment of the present invention, an offset calculation operation is simplified. Also, though a reconfigurable hardware is configured as shown in FIG. 7B, the configuration may be very simply embodied. Also, a memory bank in which an array is stored may be calculated by using only a constant term from an array subscript expression, instead of being calculated after calculating the entire array subscript expression. Accordingly, this may be very simply embodied in a reconfigurable architecture.

Namely, when the linearization and simplification according to an exemplary embodiment of the present invention are performed, reconfigurable hardware required for operation of an array included in a loop is simplified.

The inventive concept may be applied to a computer architecture of a different form, which performs an operation of an array included in a loop as well as a reconfigurable architecture. Also, though the method according to exemplary embodiments of the present invention is described as being performed when compiling, the method may be performed at a different points in time.

Also, the exemplary embodiments of the present invention include a computer readable medium including a program instruction for executing various operations realized by a computer. The computer readable medium may include a program instruction, a data file, and a data structure, separately or cooperatively. The program instructions and the media may be those specially designed and constructed for the purposes of the present invention, or they may be of the kind well known and available to those skilled in the art of computer software arts. Examples of the computer readable media include magnetic media (e.g., hard disks, floppy disks, and magnetic tapes), optical media (e.g., CD-ROMs or DVD), magneto-optical media (e.g., floptical disks), and hardware devices (e.g., ROMs, RAMs, or flash memories, etc.) that are specially configured to store and perform program instructions. The media may also be transmission media such as optical or metallic lines, wave guides, etc. including a carrier wave transmitting signals specifying the program instructions, data structures, etc. Examples of the program instructions include both machine code, such as produced by a compiler, and files containing high-level languages codes that may be executed by the computer using an interpreter.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method for processing an array in a loop in a computer system, the method comprising:
applying a loop unrolling to a multi-dimensional array included in a loop based on a predetermined unrolling factor to generate a plurality of unrolled multi-dimensional arrays; and
transforming each of the plurality of unrolled multi-dimensional arrays into a one-dimensional array having an array subscript expression in a form of an affine function with respect to each of a plurality of loop counter variables of the array subscription expression.

2. The method of claim 1, wherein the one-dimensional arrays included in the loop use different memory banks.

3. The method of claim 1, wherein each of the loop counter variables indicates a number of actual iterations of the loop.

4. The method of claim 1, wherein the transforming each of the plurality of unrolled multi-dimensional arrays into the one-dimensional array comprises:

generating a stride $S_i$ by $A_i * ED_i$, where $A_i$ is a factor of an ith array index variable of the unrolled multi-dimensional array, and $ED_i$ is an effective dimension value for the ith array index variable of the array subscript expression of the one-dimensional array;
generating a constant term C by summing of values of $B_i * ED_i$ for all i, where $B_i$ is a constant term of the ith array index variable of the unrolled multi-dimensional array; and
generating the array subscript expression of the one-dimensional array by using the stride $S_i$ for a stride of the ith array index variable of the array subscript expression of the one-dimensional array and the constant term C for a constant term of the array subscript expression.

5. The method of claim 4, wherein the effective dimension value $ED_i$ for the ith array index variable is obtained by multiplying maximum indexes of all the subsequent dimensions of the unrolled multi-dimensional array.

6. The method of claim 4, wherein the transforming of each of the plurality of the unrolled multi-dimensional arrays further comprises:
generating a new stride $S'_i$ for ith loop counter variable by rounding the value of $S_i * UF/IF$, where $S_i$ is the stride of the ith array index variable of the array subscript expression of the one-dimensional array, UF is the predetermined unrolling factor, and IF is a predetermined interleaving factor;
generating a new constant term $C'$ by rounding the value of $C/IF$; and
changing the array index variable of the array subscript expression into the loop counter variable and transforming the array subscript expression of the one-dimensional array into a new array subscript expression using the new stride and the new constant term.

7. The method of claim 6, further comprising:
generating a memory bank number by C modulo IF; and
transforming the one-dimensional array included in the loop into an array using the memory bank number.

8. The method of claim 6, wherein the interleaving factor is a number of memory banks used in memory interleaving.

9. A method of processing an array in a loop in a computer system, the method comprising:
generating a new stride $S'_i$ for an ith loop counter variable by rounding the value of $S_i * UF/IF$, where $S_i$ is a stride of the ith array index variable of an array subscript expression of the array, UF is a predetermined unrolling factor, and IF is a predetermined interleaving factor;
generating a new constant term $C'$ by rounding the value of $C/IF$, where C is a constant term of the array subscript expression of the array; and
changing the array index variable of the array subscript expression into the loop counter variable and transforming the array subscript expression of the array into a new array subscript expression using the new stride and the new constant term.

10. The method of claim 9, further comprising:
generating a memory bank number by C modulo IF; and
transforming the array included in the loop into an array using the memory bank number.

11. The method of claim 9, wherein the array is a one-dimensional array.

12. A non-transitory computer readable recording medium in which a program for executing a method for processing an array in a loop in a computer system is recorded, the method comprising:

applying loop unrolling to a multi-dimensional array included in a loop based on a predetermined unrolling factor to generate a plurality of unrolled multi-dimensional arrays; and transforming each of the plurality of unrolled multi-dimensional arrays into a one-dimensional array having an array subscript expression in a form of an affine function with respect to each of a plurality of counter variables of the array subscript expression.

13. The computer readable recording medium of claim 12, wherein each of the loop counter variables indicates a number of actual iterations of the loop.

14. The computer readable recording medium of claim 12, wherein the transforming each of the plurality of unrolled multi-dimensional arrays into one-dimensional array comprises:

generating a stride $S_i$ for an ith array index variable of the array subscript expression of the one-dimensional array by $A_i*ED_i$, where $A_i$ is a factor of the ith array index variable of the unrolled multi-dimensional array, and $ED_i$ is an effective dimension value for the ith array index variable of the array subscript expression of the one-dimensional array;

generating a constant term C by summing of values of $B_i*ED_i$ for all i, where $B_i$ is a constant term of the ith array index variable of the unrolled multi-dimensional array; and generating the array subscript expression of the one-dimensional array by using the stride $S_i$ for the ith array index variable of the array subscript expression and the constant term C for a constant term of the array subscript expression.

15. The computer readable recording medium of claim 14, wherein the effective dimension value $ED_i$ for the ith array index variable is obtained by multiplying maximum indexes of all the subsequent dimensions of the unrolled multi-dimensional array.

16. The computer readable recording medium of claim 14, wherein the transforming of the unrolled multi-dimensional arrays further comprises:

generating a new stride $S'_i$ for ith loop counter variable by rounding the value of $S_i*UF/IF$, where $S_i$ is the stride of the ith array index variable of the array subscript expression of the one-dimensional array, UF is the predetermined unrolling factor, and IF is a predetermined interleaving factor;

generating a new constant term C' by rounding the value of C/IF, where C is the constant term of the array subscript expression of the one-dimensional array and IF is the predetermined interleaving factor; and changing the array index variable of the array subscript expression into the loop counter variable and transforming the array subscript expression of the one-dimensional array into a new array subscript expression using the new stride and the new constant term.

17. The computer readable recording medium of claim 16, the method further comprising:

generating a memory bank number by C modulo IF; and transforming the one-dimensional array included in the loop into an array using the memory bank number.

18. A computing apparatus comprising:

a processor comprising:

a loop unroller applying loop unrolling to a multi-dimensional array included in a loop based on a predetermined unrolling factor to generate a plurality of unrolled multi-dimensional arrays; and an array transformer transforming each of the plurality of unrolled multi-dimensional arrays into a one-dimensional array having an array subscript expression in a form of an affine function with respect to each of a plurality of counter variables of the array subscript expression.

19. The computing apparatus of claim 18, wherein each of the loop counter variables indicates a number of actual iterations of the loop.

20. The computing apparatus of claim 18, wherein the array transformer:

generates a stride $S_i$ for an ith array index variable of the array subscript expression of the one-dimensional array by $A_i*ED_i$, where $A_i$ is a factor of the ith array index variable of the unrolled multi-dimensional array, and $ED_i$ is an effective dimension value for the ith array index variable of the array subscript expression of the one-dimensional array;

generates a constant term C by summing of values of $B_i*ED_i$ for all i, where $B_i$ is a constant term of the ith array index variable of the unrolled multi-dimensional array; and generates the array subscript expression of the one-dimensional array by using the stride $S_i$ for the ith array index variable of the array subscript expression and the constant term C for a constant term of the array subscript expression.

21. The computing apparatus of claim 20, wherein the effective dimension value $ED_i$ for the ith array index variable is obtained by multiplying maximum indexes of all the subsequent dimensions of the unrolled multi-dimensional array.

22. The computing apparatus of claim 21, wherein the array transformer:

generates a new stride $S'_i$ for ith loop counter variable by rounding the value of $S_i*UF/IF$, where $S_i$ is the stride of the ith array index variable of the array subscript expression of the one-dimensional array, UF is the predetermined unrolling factor, and IF is a predetermined interleaving factor;

generates a new constant term C' by rounding the value of C/IF; and changes the array index variable of the array subscript expression into the loop counter variable and transforming the array subscript expression of the one-dimensional array into a new array subscript expression using the new stride and the new constant term.

23. The computing apparatus of claim 22, wherein a memory bank number is generated by C modulo IF; and the one-dimensional array included in the loop is transformed into an array using the memory bank number.

* * * * *